Nov. 12, 1968

R. F. ROLSTEN ETAL 3,409,975

WELDING BY HIGH ENERGY STRESS FRONT

Filed Aug. 23, 1966

INVENTORS
ROBERT F. ROLSTEN
HAROLD H. HUNT

BY *Harry A. Herbert Jr.*
*Herbert H. Brown* and

ATTORNEYS

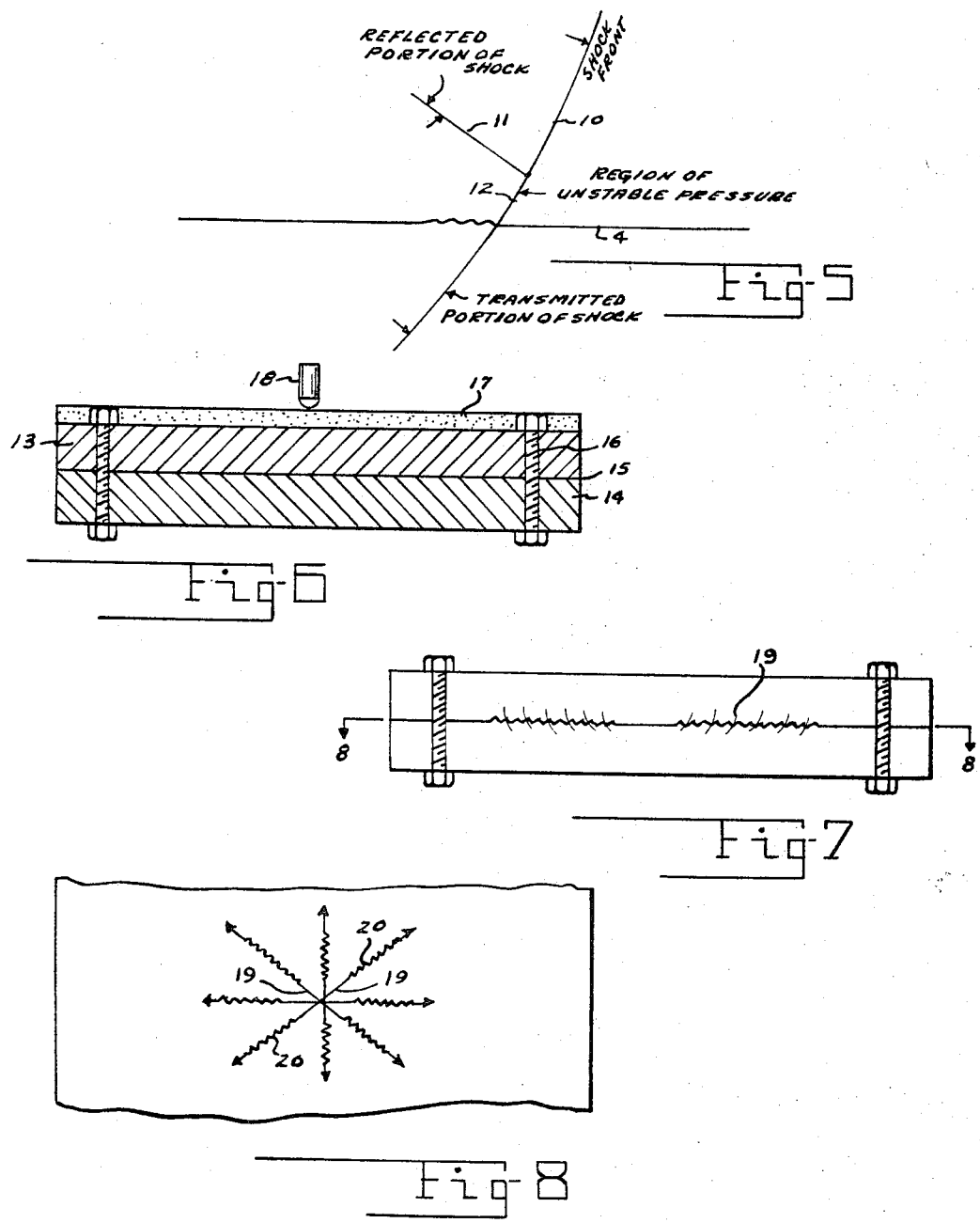

3,409,975
WELDING BY HIGH ENERGY STRESS FRONT
Robert F. Rolsten, Dayton, Ohio, and Harold H. Hunt, La Mesa, Calif., assignors to the United States of America as represented by the Secretary of the Air Force
Filed Aug. 23, 1966, Ser. No. 574,873
2 Claims. (Cl. 29—470.1)

ABSTRACT OF THE DISCLOSURE

An improved method of welding metal plates together in which the plates are first tightly clamped together and a layer of explosive is laid down over the upper plate. A detonator causes the layer to explode and set up shock waves which pass through the upper plate and move obliquely along the interface between the plates. The shock waves produce re-occurring ripples which serve to increase the area of intimate contact and thus enhance the clamping effect. The ripples also break up any oxide coating present and the accompanying strains provide an interchange of atoms across the interface to produce a strong bond.

The improved method also includes the use of a relatively deep recess on the side of the plate carrying the explosive which serves to control the direction of the shock waves caused by the explosion to further enhance the bonding effect.

---

The present invention relates to the welding of metals, more particularly to the bonding of metals by the use of a high energy source, such as high explosive.

The most common limitation to making sound welds is the removal of oxide and surface contamination that would inhibit welding. If the oxides are soluble in the metal themselves, they are easily welded, but if the oxides are not soluble they must be chemically removed or broken up by mechanical deformation where the joint is being bonded.

Melting is the usual commercial method for joining metals. In this process the surface films (principally oxides) frequently dissolve or are caused to dissolve in the melt and float to the liquid surface, thereby removing themselves from the position of the bond.

However in the pressure welding processes, as distinguished from the melting form of bond and such as forge welding, oxyacetylene pressure welding, the surfaces usually must be cleaned before a good weld can be effected. This may represent considerable effort and expense, particularly if the parts to be joined are of extensive size or area.

An object of the invention is to provide an improved welding process of the pressure type, and in which the forces or interactions set up at the bonding surface cause the removal of the omnipresent surface oxide film, regardless of the proneness of the metal to oxidize. Thus, clean and uncontaminated surfaces are presented at the welding position to contribute immeasurably to the formation of a strong joint.

Another object is to provide a welding process in which the bond is formed by atom phenomen across the interface while the parts are held together under pressure.

Still another object is to provide an improved pressure welding process in which the parts to be welded are held firmly together and steep shock waves, that are produced by the sudden release of high energy, for example, a high velocity particle, high explosive, etc., are sent through the parts which interlace the joint to produce a strong bonding effect.

These objects are attained in brief by clamping the parts together and using shock waves of an intense character which are induced by the sudden release of high energy, for example, a high explosive, etc., and which travel obliquely along the interface between the parts. These shock waves strain the abutting surfaces at a very high rate to form a wave-like or ripple effect which follows the shock. The ripples serve to increase the area of intimate contact, also breaks up and oxide coating present, and the accompanying strains provide an interchange of atoms across the interface to produce a strong bond.

The invention will be better understood when reference is made to the following description and the accompanying drawings, in which:

FIG. 5 is a digram indicating the instability of the mach stem of the pressure wave generated by the moving shock which gives rise to the atom agitation at the interface;

FIG. 6 shows a modified set of plates, ready to be bonded in the improved manner;

FIG. 7 is an elevational view of the structure of FIG. 6 after the high explosive material has been detonated and showing the transverse of the shock line and accompanying ripples along the interface to effect the bonding action; and FIG. 8 depicts a plan view, partially broken away, of the structure shown in FIG. 6, and indicating the movement of the shock line and ripples at the instant the explosive material is detonated.

Figure 1:
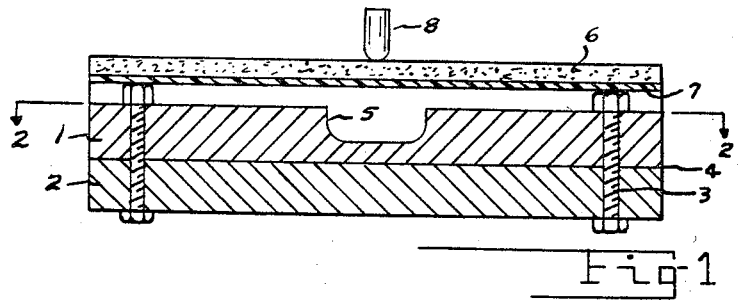
FIG. 1 is a cross-section of two plates held together and ready to be subjected to strong shock waves for generating a bond at the interface.
Figure 2:
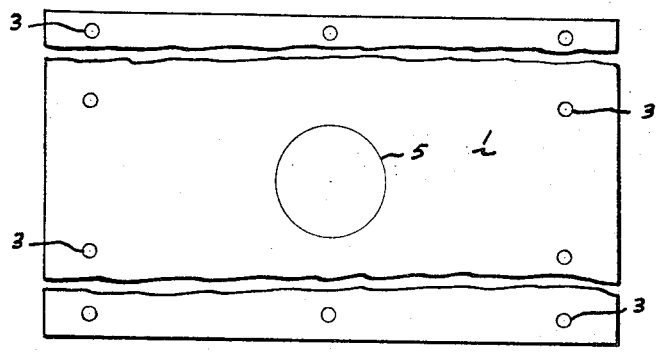
FIG. 2 depicts a plan view of the structure taken about line 2—2 in FIG. 1.

In FIG. 1, reference characters 1 and 2 represent typical plates of metal, such as steel, copper, aluminum, etc., which it is desired to weld together. These plates are cleansed of readily removable scum and are held firmly together by any suitable clamping means such as bolts 3, evenly distributed about the periphery of the plates. Thus, the interface of 4 between the abutting surfaces leaves no perceptible space therebetween. The upper plate 1 is provided with a circular recess 5 of a size and depth depending on the extent of the weld to be obtained between the plates. The plates are preferably fairly thin but could be as heavy as ½″ thick with a recess measuring about 1″ in diameter and ⅜″ deep, thus leaving ⅛″ thickness of metal between the bottom of the recess and the position of the interface 4. The recess is preferably rounded at the bottom.

A layer of high explosive material 6, such as trinitrotoluene (TNT), possibly 9/16″ thick, may be laid on top of the upper plate, the recess also being filled with the material. However, and as illustrated, it is preferred that the explosive material 6 be positioned away from the plate a short distance on a rigid, non-metallic support 7. In this manner, the thickness of the explosive material can be increased without damaging the plates and thus provide a greater depth of the shock waves and the distance over which a given stress level will be maintained through the workpiece. A detonator 8 of any suitable and well-known type, and if desired, a booster explosive charge (not shown) are positioned in contact with the explosive material.

Figure 3:
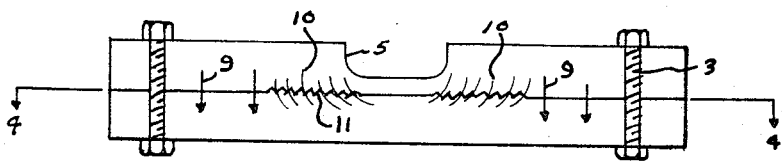
FIG. 3 represents a diagrammatic view of the structure of FIG. 1 after the release of the high energy, for example, the high explosive material has been detonated, and showing the progress of the shock wave and ripples along the interface.

When the detonator initiates an explosion in the material 6, a downward pressure, indicated at 9, forces the upper plate into intimate contact with the lower plate. The resulting hypervelocity impact sets up a shock wave, indicated at 10, which presents a steep wave front and moves across both sides of the interface. It travels at supersonic speed outwardly in concentric circular paths of increasing diameter from the position of the curved lower boundary of the recess. At those areas of the metal immediately prior to the arrival of the shock wave, there appears to be no pressure strain. But upon the arrival of the shock effect as the lines criss-cross the joint in a steep oblique manner, an intense agitation of atoms derived from the abutting surfaces is set up which manifests itself as a series of ripples along the surface. The ripples are indicated in FIG. 3 at 11. The shock wave is kept preferably quite thin or "steep" in order that there is sufficient heat transfer to induce all parts of the shock wave to propagate at the same velocity.

Figure 4:
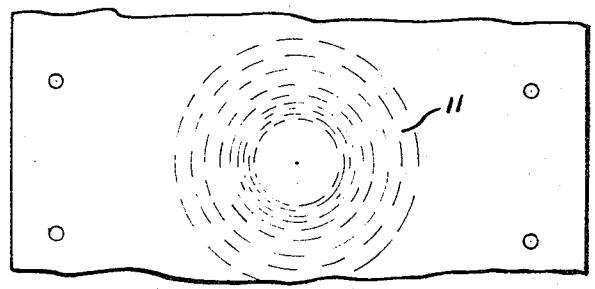
FIG. 4 represents by diagram and in plan, the bonding ripples initiated by the shock wave. The ripples are shown as formed by the shock moving out from the origin point of energy release, or center of the detonation.

The ripples radiate outwardly in curved paths coincident with the arrival of the shock wave, as indicated by the dash lines in FIG. 4. It will be noted that the ripples usually are bunched closer together at the center point of origin than at the outer edge which may indicate greater strain at this point. This ripple effect appears to break up any oxide or other contaminating layer, and the intense migration to and fro of the atoms at the interface causes a strong bond between the plates, particularly in the region where the shock and ripple effect are the greatest.

While we do not wish to be limited to any theory as to the manner in which the weld is actually formed, we believe that it may be due to the production of an unstable pressure effect set up in the metal as the result of the shock wave. This instability of the pressure wave which gives rise to the ripple effect and eventual bond, is diagrammatically illustrated in FIG. 5. The interface between the plates is indicated by the line 4. The oblique shock front is indicated at 10. As the shock proceeds from left to right, a reflected counterpart wave 11 is set up and the reaction of the two waves on one another gives rise to the unstable condition in the lower portion of the original shock wave. This portion is indicated at 12. Thus, the intensity of the moving shock front at the position of the interface varies at a fast rate, and produces variable strains, which cause the formation of minute ripples that follow the shock. The ripples show a definite crest structure which may explain the mode of their formation; i.e., the movement of the plastic surfaces at different velocities while the surfaces are held together under the pressure produced by the explosion impact which is much greater than that offered by the clamping devices.

We have also found that it may not be necessary to provide a recess in the upper plate in order to obtain at least a practical bond, even though the recess does appear to offer some slight advantage in initially directing the movement of the shock wave. Thus in FIGS. 6 and 7, there is shown a pair of metal plates 13, 14, which are entirely flat on both sides and about one another at the interface 15. As in the case of the previous figures, the plates are held firmly together by clamps or bolts 16 suitably spaced about the periphery. A layer of high explosive material 17 is spread over the top of the upper plate, but preferably spaced therefrom as in FIG. 1, and a detonator 18 applied thereto. When the material 17 is exploded, the plates are caused to be pressed together in intimate contact. An oblique wave, indicated at 19, is initiated, beginning at about the position of the detonator and radiating outwardly toward the four edges of the plates as indicated in FIG. 8. This shock wave gives rise to ripples 20 in the abutting surfaces which not only break up and eliminate any contamination, such as an oxide coating at the interface but are accompanied by the diffusion of metal atoms across the interface caused by the incident strains. The wave-like or rippled surface increases the area of intimate contact initiated by the explosive material, and thus enhances the bond between the contiguous surfaces.

While we have illustrated and described the detonator as being centrally located with respect to the parts to be welded, it will be apparent that, if desired, the detonator can be moved to any other appropriate position, in which case the pattern of movement of the shock wave and the ripple effect might be altered from that shown. But an effective bond would still be present provided the shock wave is sufficiently strong at the interface as to produce an intense agitation of atoms across the abutting surfaces.

Welded joints of this character are necessarily of a limited type as far as size is concerned. But they are extremely useful in spot welding metal plates or sheets together. The improved bonding method is relatively inexpensive because the only structure that is necessary besides an effective clamping arrangement, is the use of relatively cheap explosive material and a detonator.

While a certain specific embodiment has been described, it is obvious that numerous changes may be made without departing from the general principle and scope of the invention.

We claim:

1. In the method of welding metal plates together, the steps of bolting the plates together in clamped abutting relation to provide a firm metal-to-metal contact over the abutting surfaces, the further step of detonating a quantity of high explosive in the region of the surface of one of the plates and directing the resultant shock wave to extend across the interface at a steep angle and in sufficient strength as to cause ripples in the metal along the interface, said ripples serving to break up any oxide formation and bring the plates into such intimate contact with one another that atom agitation is initiated as to produce a bond therebetween.

2. In the method of welding metal plates together, the step of positioning one plate directly over the other in clamped abutting relation, one of said plates having a recess on the surface remote from the interface, said recess having a depth extending at least one-half the thickness of said one plate, applying a layer of explosive material along said surface and within said recess, the further step of detonating the explosive material along the surface and in the recess to form a shock wave directed by the contour of the recess into a steep wave front which travels along the interface and causes intense atom agitation at the abutting surfaces which produces a welding effect.

References Cited

UNITED STATES PATENTS 3,197,855   8/1965   Carter et al. _____ 29—421
3,316,627   5/1967   Suzuki et al. _____ 29—421

CHARLIE T. MOON, *Primary Examiner.*

PAUL M. COHEN, *Assistant Examiner.*